United States Patent
Lynn et al.

(10) Patent No.: US 9,228,033 B2
(45) Date of Patent: Jan. 5, 2016

(54) POLYMERIZATION PROCESSES USING REACTOR COMPONENTS SUSPENDED IN HYDROCARBON GELS

(71) Applicant: Univation Technologies, LLC, Houston, TX (US)

(72) Inventors: Timothy R. Lynn, Glen Gardner, NJ (US); John J. Bielak, South Amboy, NJ (US); Wesley R. Mariott, Manvel, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 14/413,367

(22) PCT Filed: Aug. 21, 2013

(86) PCT No.: PCT/US2013/055994
§ 371 (c)(1),
(2) Date: Jan. 7, 2015

(87) PCT Pub. No.: WO2014/035763
PCT Pub. Date: Mar. 6, 2014

(65) Prior Publication Data
US 2015/0166692 A1  Jun. 18, 2015

Related U.S. Application Data

(60) Provisional application No. 61/695,713, filed on Aug. 31, 2012.

(51) Int. Cl.
| | |
|---|---|
| *C08F 2/00* | (2006.01) |
| *C08F 10/02* | (2006.01) |
| *C08F 10/06* | (2006.01) |
| *C08K 5/01* | (2006.01) |

(52) U.S. Cl.
CPC ............. *C08F 10/02* (2013.01); *C08F 2/005* (2013.01); *C08F 10/06* (2013.01); *C08K 5/01* (2013.01); *C08F 2410/01* (2013.01)

(58) Field of Classification Search
CPC ............ C08F 2/00; C08F 10/00; C08F 10/02; C08F 10/06; C08F 2410/01; C08K 5/01
USPC .......................................................... 526/88
See application file for complete search history.

(56) References Cited

U.S. PATENT DOCUMENTS

| | | | |
|---|---|---|---|
| 4,351,913 A * | 9/1982 | Patel | .............................. 523/218 |
| 6,149,693 A | 11/2000 | Geib | |
| 2007/0071802 A1 | 3/2007 | Wickenhauset et al. | |
| 2009/0318315 A1 | 12/2009 | Ghesner et al. | |
| 2011/0077367 A1 * | 3/2011 | Gundert et al. | ............ 526/123.1 |

FOREIGN PATENT DOCUMENTS

| | | |
|---|---|---|
| EP | 1489110 A1 | 12/2004 |
| WO | WO 98/38981 | 9/1998 |

* cited by examiner

*Primary Examiner* — Fred M Teskin
(74) *Attorney, Agent, or Firm* — Brooks, Cameron & Huebsch, PLLC

(57) ABSTRACT

A polymerization process is disclosed, including: providing a reactor component suspended in a hydrocarbon gel; introducing the reactor component to a polymerization reactor; and polymerizing an olefin in the polymerization reactor to form an olefin-based polymer. Another polymerization process is disclosed, including: providing a hydrocarbon gel comprising a reactor component suspended therein; combining the hydrogen gel with an additional reactor feed; introducing the combined mixture of the hydrocarbon gel and the additional reactor feed to a polymerization reactor; and polymerizing an olefin in the polymerization reactor to form an olefin-based polymer. A hydrocarbon gel is disclosed, including: a liquid hydrocarbon; a gelling agent; and a reactor component.

20 Claims, No Drawings

POLYMERIZATION PROCESSES USING REACTOR COMPONENTS SUSPENDED IN HYDROCARBON GELS

CROSS-REFERENCE TO RELATED APPLICATIONS

This application is a National Stage application under 35 U.S.C. §371 of International Application No. PCT/US2013/55994, filed Aug. 21, 2013, that claims the benefit of Ser. No. 61/695,713, filed Aug. 31, 2012, the disclosures of which are incorporated by reference in their entireties.

BACKGROUND

Advances in polymerization processes and catalysts have produced new polymers having improved physical and mechanical properties useful in a wide variety of products and applications. With the development of new catalysts, the choice of polymerization, such as solution, slurry, high pressure or gas phase, for producing a particular polymer has been greatly expanded. Advances in polymerization technology have also provided more efficient, highly productive and economically enhanced processes.

A number of different techniques have been developed for delivering reactor components, such as continuity additives and catalysts, to polymerization reactors. One technique involves delivery of the reactor components to the reactor in a mineral oil slurry with the reactor component suspended in a mineral oil. While these mineral oil slurries have been used successfully for reactor component delivery, their use can be challenging because the reactor components often settle from the slurries prior to use. Accordingly, the reactor component storage containers need to be agitated to re-suspend the reactor component in the mineral oil. For example, certain reactor components, such as polyethyleneimine, may require continuous, vigorous agitation to keep the hydrophilic polyethyleneimine suspended in the mineral oil. In addition, special precautions may need to be taken to avoid settling of the reactor component in the lines which feed the reactor. For example, smaller diameter lines could be used to help maintain high velocity of the mineral oil slurry, but this can lead to high pressure drops or line plugging. Alternately, lines may need to be steeply sloped to the reactor, which can then complicate the layout in typical chemical plants. Moreover, because certain catalyst components, such as solid metallocene catalysts, settle too quickly in the mineral oil liquid, solutions of the catalyst component have been used in place of the mineral oil slurries. However, the use of the solutions poses challenges in the compatibility of certain solvents, such as toluene, with the polymerization process.

Accordingly, there exists a need for improved polymerization processes, for example, improved techniques for delivering reactor components to a polymerization reactor. Such techniques may reduce the tendency of the reactor components to settle before they reach the polymerization reactor.

SUMMARY

Disclosed herein is a polymerization process that may comprise providing a reactor component suspended in a hydrocarbon gel, introducing the reactor component to a polymerization reactor; and polymerizing an olefin in the polymerization reactor to form an olefin-based polymer.

Further disclosed herein is a polymerization process that may comprise providing a hydrocarbon gel comprising a reactor component suspended therein, combining the hydrogen gel with an additional reactor feed, introducing the combined mixture of the hydrocarbon gel and the additional reactor feed to a polymerization reactor, and polymerizing an olefin in the polymerization reactor to form an olefin-based polymer.

Further disclosed herein is a hydrocarbon gel that may comprise a liquid hydrocarbon, a gelling agent, and a reactor component.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

Hydrocarbon Gels

Described herein are methods that use a hydrocarbon gel for delivery of reactor components to a polymerization reactor. As used herein, the term "hydrocarbon gel" refers to a colloid in which the dispersed phase comprising a liquid hydrocarbon has combined with the continuous phase to produce a viscous, jellylike, composition while at rest. The reactor component may be suspended in the hydrocarbon gel. The hydrocarbon gel may comprise a gelling agent, a liquid hydrocarbon, and a reactor component (or mixture of reactor components). Because the hydrocarbon gels are stable at ambient storage conditions, the hydrocarbon gels can be stored and then delivered to the reactor, reducing or even potentially eliminating the need for agitating the storage container. In addition, hydrocarbon gels can be used to deliver reactor components that settle too quickly for the practical use of hydrocarbon slurries. Further, because the hydrocarbon gels exhibit shear thinning, they can readily flow upon application of stress, but exhibit no flow at steady state when stress is removed.

A gel is typically obtained by use of a gelling agent. In embodiments, the continuous phase of the hydrocarbon gel may comprise the gelling agent. The gelling agent can be or include any gelling agent capable of forming a gel with the liquid hydrocarbon. Gelling agents that may be suitable for use may be inert. A gelling agent or other material is generally considered inert when it does not contain components having a tendency to react with the catalyst or components that contain atoms selected from oxygen, sulfur, or nitrogen, for example. For example, the gelling agent may comprise a polymeric gelling agent, which may be a polymeric block copolymer. Examples of suitable polymeric block copolymers include diblock, triblock, multi-block, star, and graft arrays. One example of a suitable polymeric gelling agent is polyethylene. For example, the polymeric gelling agent may comprise a polyethylene block copolymer. Additional examples of suitable polymeric gelling agents include, without limitation, styrene/butadiene copolymers, styrene/isoprene copolymers, ethylene/propylene copolymers, and polybutadiene. However, the gelling agent is not limited to polymeric gelling agents. For example, metallic soaps (e.g., higher fatty acid salts of a non-alkali metal) may be suitable for use. Specific non-limiting examples of higher fatty acid salts that may be suitable comprise aluminum stearate, aluminum distearate, aluminum palmitate, calcium stearate, zinc stearate, zinc myristate, magnesium myristate, etc. Other suitable gelling agents may comprise, for example, fatty acid dextrin esters, metallic salts of dialkyl phosphate esters, and organic-denatured bentonites. Additional examples of suitable gelling agent may include ethoxylated amines, such as alkylethanolamine or ethoxylated stearyl amines, including ATMER AS-990 and IRGASTAT AS-990. While certain of the above gelling agents may contain oxygen or other atoms that may react with the catalyst and, as a result, reduce catalyst productivity, such gelling agents may be used in sufficiently low quantities that do not significantly affect catalyst productivity. Combinations of two or more gelling agents may also be suitable. For example, a combination of an aluminum stearate and alkylethanolamine may be used in some embodiments.

The gelling agent may be present in the hydrocarbon gel in an amount in a range of from about 0.1% to about 25% by weight of the hydrocarbon gel. In another example, the gelling agent may be present in an amount ranging between any of and/or including any of about 0.1%, about 0.5%, about 1%, about 2%, about 3%, about 4%, about 5%, about 6%, about 7%, about 8%, about 9%, about 10%, about 15%, about 20%, or about 25% by weight of the hydrocarbon gel. For example, the gelling agent may be present in an amount in a range of from about 1% to about 5% or from about 1% to about 2% by weight of the hydrocarbon gel.

The liquid hydrocarbon can be or include any hydrocarbon capable of forming a gel and suspending the reactor component. The liquid hydrocarbon may be inert. Examples of liquid hydrocarbons suitable for gelling with the gelling agent comprise linear and/or branched alkanes such as ethane, propane, butane, isobutene, pentane, isopentane, hexane, heptane, octane, decane, dodecane, hexadecane, octadecane, and the like; alicyclic hydrocarbons such as cyclopentane, methylcyclopentane, cyclohexane, cyclooctane, norbornane, ethylcyclohexane, and the like; aromatic hydrocarbons such as benzene, toluene, ethylebenzene, propylbenzene, butylbenzene, xylene, and the like; petroleum fractions such as gasoline, kerosene, light oils; aliphatic hydrocarbons, and the like. For example, the liquid hydrocarbon may comprise mineral oil. Any two or more liquid hydrocarbons can be used together to provide the liquid hydrocarbon.

The liquid hydrocarbon may be present in the hydrocarbon gel at from about 60% to about 99%, by weight of the hydrocarbon gel. In another example, the liquid hydrocarbon may be present in an amount ranging between any of and/or including any of about 60%, about 65%, about 70%, about 75%, about 80%, about 85%, about 90%, about 95%, or about 99%, by weight of the hydrocarbon gel. For example, the liquid hydrocarbon may be present in an amount in a range of from about 80% to about 99% or about 85% to about 95%, by weight of the hydrocarbon gel.

Reactor components that may be suitable for suspending in the hydrocarbon gel may comprise any of a variety of different components that are typically delivered to a polymerization reactor in the polymerization of olefins. The reactor components may be a liquid or a particulate solid, as desired for a particular application. Examples of suitable reactor components comprise continuity additives, catalysts and/or catalyst system components, fluidization aids (e.g., an inert particulate materials, such as carbon black, silica, talc, and clays, as well as inert polymeric materials), chain transfer agents, promoters, scavenging agents, and combinations thereof. In embodiments, the reactor component may be the gelling agent. For example, the gelling agent may comprise aluminum distearate and/or ethoxylated amines, such an alkylethanolamine, which may also be used as a continuity additive in the polymerization reactor.

The amount of the reactor component suspended in the hydrocarbon gel depends on a number of factors, including the type and amount of the gelling agent and liquid hydrocarbon used, the particular reactor component and the amount of that component that needs to be fed. The reactor component may be present in the hydrocarbon gel in an amount in a range of from about 0.1% to about 30% by weight of the hydrocarbon gel. In another example, the reactor component may be present in an amount ranging between any of and/or including any of about 0.1%, about 0.5%, about 1%, about 5%, about 10%, about 15%, about 20%, about 25%, or about 30% by weight of the hydrocarbon gel. For example, the reactor component may be present in an amount in a range of from about 1% to about 20% or from about 5% to about 20% by weight of the hydrocarbon gel. It should be understood, however, that concentrations outside these specified ranges may also be suitable for certain applications.

A technique for preparing a hydrocarbon gel will now be described in more detail. However, it should be understood that other suitable techniques may be also used for preparation of the hydrocarbon gel as will be appreciated by those of ordinary skill in the art. A hydrocarbon gel prepared as described below by a process that comprises heating followed by cooling may be referred to as a "quench-cooled hydrocarbon gel." First, the hydrocarbon liquid may be heated to a temperature above the melting point of the gelling agent. For example, the hydrocarbon liquid may be heated to a temperature greater than or equal to about 70° C., greater than or equal to about 90° C., greater than or equal to about 110° C., or greater than or equal to about 120° C. For example, the hydrocarbon liquid may be heated to a temperature in a range of about 70° C. to about 150° C., about 90° C. to about 130° C., about 110° C. to about 130° C., or about 120° C. to about 130° C. The gelling agent may then be dissolved in the hydrocarbon liquid to obtain a homogenous solution. The gelling agent and the hydrocarbon liquid may be combined in any suitable order or sequence. For example, the gelling agent may be combined with the hydrocarbon liquid prior to heating, or the gelling agent may be combined with the hydrocarbon liquid after the hydrocarbon liquid has been heated or during the heating of the hydrocarbon liquid.

The mixture of the gelling agent and the hydrocarbon liquid may then be cooled down, for example, to a temperature of less than or equal to about 50° C., or a temperature of between about 0° C. and about 50° C. In embodiments, the mixture may be cooled down to about room temperature. The hydrocarbon gel may thus be obtained. If the mixture is cooled too slowly, the resulting gel may be too viscous. Accordingly, the cooling may be at a rate, for example, of at least about 1° C. per minute. For example, the cooling may be at a rate of at least about 10° C. per minute, about 20° C. per minute, or about 30° C. per minute. After cooling, the preparation technique may further comprise stirring or otherwise agitating the hydrocarbon gel for a period of time ranging from about 1 minute to about 24 hours, or from about 1 hour to about 8 hours. In some embodiments, the hydrocarbon gel may be stirred at a rate of about 1,000 rpm in a flow-through apparatus with about 0.21 volumes at a rate of from about 9 to about 20 liters per hour. It has been found that additional agitation applied to the hydrocarbon gel after cooling may provide a gel capable of suspending the reactor component while also having a reduced viscosity more suitable for delivery from a storage container to a polymerization reactor.

It has been found that the reactor component can be suspended in the hydrocarbon gel for extended periods of time without undesired settling. The reactor component may be combined with the mixture of the liquid hydrocarbon and the gelling agent prior to cooling. Alternatively, the reactor component may be combined with the hydrocarbon gel after cooling.

As previously mentioned, the hydrocarbon gels may be used for delivery of the reactor component to a polymerization reactor. For example, the hydrocarbon gel comprising the reactor component suspended therein may be introduced to the reactor. The hydrocarbon gel may be introduced to the reactor as an individual feed or can be combined with other feeds prior to introduction to the reactor. In embodiments, a hydrocarbon gel comprising a continuity additive suspended therein can be combined with catalyst slurry prior to feeding the combined hydrocarbon gel/catalyst mixture to the reactor. The catalyst slurry may comprise, for example, a supported catalyst or catalyst system suspended in a carrier liquid, such as mineral oil. In embodiments, the supported catalyst system may comprise two or more catalyst components and an activator on support material. In alternative embodiments, a hydrocarbon gel comprising a catalyst can be combined with a catalyst slurry prior to feeding the combined mixture to the reactor. The catalyst may be adsorbed and activated on the support material in the catalyst slurry.

Continuity Additives

In the polymerization processes disclosed herein, it may be desired to use a continuity additive, for example, to control or potentially even eliminate reactor discontinuity events, which in general are a disruption in the continuous operation of a polymerization reactor. In embodiments, the continuity additive may be suspended in a hydrocarbon gel. As used herein, the terms "continuity additive or aid" and "antifoulant agent" refer to compounds or mixtures of compounds, such as solids or liquids, that are useful in gas phase or slurry phase polymerization processes to reduce or eliminate fouling of the reactor, where "fouling" may be manifested by any number of phenomena including sheeting of the reactor walls, plugging of inlet and outlet lines, formation of large agglomerates, or other forms of reactor upsets known in the art. For purposes herein, the terms may be used interchangeably. In accordance with embodiments, the continuity additive may be used as a part of the catalyst system or introduced directly into the reactor independently of the catalyst system. In a class of embodiments, the continuity additive is supported on the inorganic oxide of the supported catalyst system described herein.

The specific continuity additive used may depend at least in part upon the nature of the static charge, the particular polymer being produced, and/or the particular catalyst being used. Non-limiting examples of continuity additives comprise fatty acid amines, amide-hydrocarbon or ethoxylated-amide compounds such as those described as "surface modifiers" in WO 96/11961; carboxylate compounds such as aryl-carboxylates and long chain hydrocarbon carboxylates, and fatty acid-metal complexes; alcohols, ethers, sulfate compounds, metal oxides and other compounds known in the art. Some specific examples of continuity additives include 1,2-diether organic compounds, magnesium oxide, ARMOSTAT 310, ATMER 163, ATMER AS-990, and other glycerol esters, IRGASTAT AS-990 and other ethoxylated amines (e.g., N,N-bis(2-hydroxyethyl)octadecylamine), alkyl sulfonates, and alkoxylated fatty acid esters; STADIS 450 and 425, KEROSTAT CE 4009 and KEROSTAT CE 5009, chromium N-oleylanthranilate salts, calcium salts of a Medialan acid and di-tert-butylphenol; POLYFLO 130, TOLAD 511 (a-olefin-acrylonitrile copolymer and polymeric polyamine), EDENOL D32, aluminum stearate, aluminum distearate, sorbitan-monooleate, glycerol monostearate, methyl toluate, dimethyl maleate, dimethyl furnarate, triethylamine, 3,3-diphenyl-3-(imidazol-1-yl)-propin, and like compounds. In some embodiments, the continuity additive is a metal carboxylate salt as described, optionally, with other compounds as described in this section.

Still other continuity additives can comprise polyethylenimines having the structure —$(CH_2$—$CH_2$—$NH)_n$—, where n can be from 10 to 10,000. The polyethyleneimines may be linear, branched, or hyperbranched (i.e., forming dendritic or arborescent polymer structures). They can be a homopolymer or copolymer of ethyleneimine or mixtures thereof (referred to as polyethyleneimine(s) hereafter). Although linear polymers represented by the chemical formula —$[CH_2CH_2NH]$— may be used as the polyethyleneimine, materials having primary, secondary, and tertiary branches can also be used. Commercial polyethyleneimine can be a compound having branches of the ethyleneimine polymer. Suitable polyethyleneimines are commercially available from BASF Corporation under the trade name LUPASOL. These compounds can be prepared as a wide range of molecular weights and product activities.

Yet additional continuity additives can comprise a polyetheramine. As used herein, the term "polyetheramine" refers to a polymer containing a polyether backbone that terminates in at least one amino group. The polyether backbone may be, for example, ethylene oxide-based, propylene oxide-based, 1,2 butylene oxide-based, tetramethylene oxide-based, or any combination thereof. The polyetheramines may be, for example, a block copolymer, a graft copolymer, or a block-graft copolymer. In some embodiments, the polyetheramine is a diblock copolymer or a triblock copolymer. In some embodiments, the polyetheramine may be a block copolymer of ethylene oxide and propylene oxide. Suitable polyetheramines may comprise, for example, monoamines, diamines, and triamines. For example, the polyether backbone may terminate in at least one primary amino group, or in at least one secondary amino group, or in at least one tertiary amino group. Suitable polyetheramines may include those commercially available from Huntsman Corporation under the trade name JEFFAMINE® polyetheramines Examples of commercially available polyetheramines for use in embodiments of the present invention include, but are not limited to: JEFFAMINE® ED series polyetheramines, such as JEFFAMINE® HK-511 polyetheramine, JEFFAMINE® ED-600 polyetheramine, JEFFAMINE® ED-900 polyetheramine, and JEFFAMINE® ED-2003 polyetheramine; JEFFAMINE® M series polyetheramines, such as JEFFAMINE® M-600 polyetheramine, JEFFAMINE® M-1000, JEFFAMINE® M-2005 polyetheramine, and JEFFAMINE® M-2070 polyetheramine; and JEFFAMINE® D series polyetheramines, such as JEFFAMINE® D-230 polyetheramine, JEFFAMINE® D-400, JEFFAMINE® D-2000 polyetheramine, and JEFFAMINE® D-4000 polyetheramine.

Any of the aforementioned continuity additives may be employed either alone or in combination as a continuity additive. For example, a metal carboxylate salt may be combined with an amine containing control agent (e.g., an extracted carboxylate metal salt with any family member belonging to the KEMAMINE (available from Chemtura USA Corporation) or ATMER (available from ICI Americas Inc.) family of products).

Other continuity additives useful in embodiments disclosed herein are well known to those in the art. Regardless of which continuity additives are used, care should be exercised in selecting an appropriate continuity additive to avoid introduction of poisons into the reactor. In addition, in selected embodiments, the smallest amount of the continuity additives necessary to bring the static charge into alignment with the desired range should be used.

The continuity additive can be introduced to the reactor as a combination of two or more of the above listed continuity additives. The continuity additive(s) can be introduced to the reactor in the form of a solution or slurry or suspended in a hydrocarbon gel. The continuity additive can be introduced to the reactor as an individual feed or can be combined with other feeds prior to introduction to the reactor. For example, the continuity additive can be combined with the catalyst or catalyst slurry prior to introducing the combined catalyst slurry/continuity additive mixture to the reactor.

The continuity additive can be introduced to the reactor separate from the catalyst slurry. In other words, the continuity additive and the catalyst slurry can be contacted within the reactor. In additional examples, the continuity additive can be mixed with the catalyst slurry and then introduced to the reactor as a mixture. In other words, the continuity additive and the catalyst slurry can be contacted outside the reactor. In still another example, a first portion of the continuity additive can be mixed with the catalyst slurry and introduced to the reactor and a second portion of the continuity additive can be introduced separately to the reactor. In other words, a first portion of the continuity additive and the catalyst slurry can be contacted outside the reactor and a second portion of the continuity additive can be contacted within the reactor with the mixture of the catalyst slurry and first portion of the continuity additive.

The amount of continuity additive introduced to the reactor and/or the catalyst slurry can be sufficient to provide a continuity additive concentration of from about 0.05 ppmw to about 200 ppmw, based on the polymer production rate. For example, the continuity additive can be introduced to the reactor, i.e. directly to the reactor and/or combined with the catalyst slurry, in an amount ranging from a low of about 1 ppmw, about 2 ppmw, or about 3 ppmw to a high of about 35 ppmw, about 45 ppmw, or about 55 ppmw, based on the polymer production rate. The amount of continuity additive introduced to the reactor can depend, at least in part, on the particular catalyst system, reactor pre-conditioning such as coatings to control static buildup, and/or other factors.

Catalyst Component

Any type of catalyst component may be used, including liquid-form catalysts, solid catalysts, and heterogeneous or supported catalysts, among others, and may be fed to the reactor as a liquid, slurry (liquid/solid mixture), or as a solid. In embodiments, the catalyst component may be fed to the reactor in a hydrocarbon gel. It should be understood that the liquid-form catalysts useful in embodiments disclosed herein should be stable and sprayable or atomizable. These catalysts may be used alone or in various combinations or mixtures. For example, one or more liquid catalysts, one or more solid catalysts, one or more supported catalysts, or a mixture of a liquid catalyst and/or a solid or supported catalyst, or a mixture of solid and supported catalysts may be used. These catalysts may be used with co-catalysts, activators, and/or promoters well known in the art. Non-limiting examples of catalyst components that may be used comprise metallocene catalysts, conventional catalysts such as Ziegler-Natta catalysts and Phillips-type chromium catalysts, and catalysts containing Group 15 elements. Also contemplated are catalysts such as $AlCl_3$, cobalt, iron, and palladium catalysts. The term "catalyst component," as used herein, is used interchangeably with the term "catalyst," and includes any compound or component, or combination of compounds and components, that is capable of increasing the rate of a chemical reaction, such as the polymerization or oligomerization of one or more olefins.

Metallocene Catalysts

Metallocene or metallocene-type catalyst compounds generally contain one or more ligands including cyclopentadienyl (Cp) or cyclopentadienyl-type structures or other similar functioning structure such as pentadiene, cyclooctatetraendiyl, and imides. It is understood by one of skill in the art that references made herein to metallocene catalyst compounds and/or systems may also refer to metallocene-type catalyst compounds and/or systems. As used herein, a catalyst system refers to a combination of a catalyst compound and a cocatalyst or activator. Typical metallocene compounds are generally described as containing one or more ligands capable of η-5 bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements. Examples of these metallocene catalyst compounds and catalyst systems are described in, for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664. Also, the disclosures of European publications such as EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759, and WO 98/011144 describe typical metallocene catalyst compounds and catalyst systems. Furthermore, metallocene catalyst compounds may contain one or more leaving group(s) bonded to the transition metal atom. For the purposes herein, the term "leaving group" may refer to one or more chemical moieties, such as a ligand, bound to the center metal atom of a catalyst component that can be abstracted from the catalyst component by an activator or cocatalyst, thus producing a catalyst species active toward olefin polymerization or oligomerization.

The Cp ligands are one or more rings or ring system(s), at least a portion of which includes π-bonded systems, such as cycloalkadienyl ligands and heterocyclic analogues. The ring(s) or ring system(s) typically comprise atoms selected from Groups 13 to 16 atoms, and, in some embodiments, the atoms that make up the Cp ligands are selected from carbon, nitrogen, oxygen, silicon, sulfur, phosphorous, germanium, boron, aluminum, and combinations thereof, where carbon makes up at least 50% of the ring members. In some embodiments, the Cp ligand(s) are selected from substituted and unsubstituted cyclopentadienyl ligands and ligands isolobal to cyclopentadienyl. Non-limiting examples of such ligands include cyclopentaphenanthrenyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$ Ind"), substituted versions thereof (as discussed and described in more detail below), and heterocyclic versions thereof.

The metal atom "M" of the metallocene compound may be selected from Groups 3 through 12 atoms and lanthanide Group atoms; or may be selected from Groups 3 through 10 atoms; or may be selected from Sc, Ti, Zr, Hf, V, Nb, Ta, Mn, Re, Fe, Ru, Os, Co, Rh, Ir, and Ni; or may be selected from Groups 4, 5, and 6 atoms; or may be Ti, Zr, or Hf atoms; or may be Hf; or may be Zr. The oxidation state of the metal atom "M" can range from 0 to +7; or may be +1, +2, +3, +4 or +5; or may be +2, +3 or +4. The groups bound to the metal atom "M" are such that the compounds described below in the structures and structures are electrically neutral, unless otherwise indicated. The Cp ligand(s) forms at least one chemical bond with the metal atom M to form the "metallocene catalyst component." The Cp ligands are distinct from the leaving groups bound to metal atom M in that they are not highly susceptible to substitution/abstraction reactions.

The metallocene catalyst component may include compounds represented by Structure (I):

$$Cp^A Cp^B MX_n \qquad (I)$$

where M is as described above; each X is chemically bonded to M; each Cp group is chemically bonded to M; and n is 0 or an integer from 1 to 4. In some embodiments, n is either 1 or 2.

The ligands represented by $Cp^A$ and $Cp^B$ in Structure (I) may be the same or different cyclopentadienyl ligands or ligands isolobal to cyclopentadienyl, either or both of which may contain heteroatoms and either or both of which may be substituted by a group R. For example, $Cp^A$ and $Cp^B$ may be independently selected from cyclopentadienyl, indenyl, tetrahydroindenyl, fluorenyl, and substituted derivatives of each.

Independently, each $Cp^A$ and $Cp^B$ of Structure (I) may be unsubstituted or substituted with any one or combination of substituent groups R. Non-limiting examples of substituent groups R as used in Structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyl thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with Structure (I) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins, such as, but not limited to, olefinically unsaturated substituents including vinyl-terminated ligands, for example 3-butenyl, 2-propenyl, 5-hexenyl, and the like. In some embodiments, at least two R groups, for example, two adjacent R groups, are joined to form a ring structure having from 3 to 30 atoms selected from carbon, nitrogen, oxygen, phosphorous, silicon, germanium, aluminum, boron and combinations thereof. Also, a substituent R group, such as 1-butanyl, may form a bonding association to the element M.

Each X in Structure (I), above, and Structures (II), below, is independently selected from: for example, halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, X is a $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, or $C_1$ to $C_{12}$ heteroatom-containing hydrocarbons, and substituted derivatives thereof. X may be selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, or $C_7$ to $C_{18}$ fluoroalkylaryls; or X may be selected from hydride, chloride, fluoride, methyl, phenyl, phenoxy, benzoxy, tosyl, fluoromethyls, and fluorophenyls; or X may be selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls; or X may be selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; or X may be selected from fluoride, methyl, ethyl, propyl, phenyl, methylphenyl, dimethylphenyl, trimethylphenyl, fluoromethyls (mono-, di- and trifluoromethyls), and fluorophenyls (mono-, di-, tri-, tetra- and pentafluorophenyls). In some embodiments, at least one X is a halogenated aryloxy group or a derivative thereof. For example, at least one X may be a pentafluorophenoxy group.

The metallocene catalyst component may include those metallocenes of Structure (I) where $Cp^A$ and $Cp^B$ are bridged to each other by at least one bridging group, (A), such that the structure is represented by Structure (II):

$$Cp^A(A)Cp^BMX_n \qquad (II)$$

These bridged compounds represented by Structure (II) are known as "bridged metallocenes." $Cp^A$, $Cp^B$, M, X and n in Structure (II) are as defined above for Structure (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, and divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for Structure (I) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $-Si(R')_2Si(R'_2)-$, $R'_2Ge=$, $R'P=$ (wherein "=" represents two chemical bonds), where R' is independently selected from hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In some embodiments, the bridged metallocene catalyst component of Structure (II) has two or more bridging groups (A).

Other non-limiting examples of bridging group (A), in Structure (II), include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In some embodiments, bridging group (A), in Structure (II), may also be cyclic, comprising, 4 to 10 ring members or 5 to 7 ring members. The ring members may be selected from the elements mentioned above, or from one or more of B, C, Si, Ge, N and O. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination thereof.

The cyclic bridging groups (A) may be saturated or unsaturated and/or carry one or more substituents and/or be fused to one or more other ring structures. If present, the one or more substituents may be a hydrocarbyl (e.g., alkyl such as methyl) or halogen (e.g., F, Cl). The one or more Cp groups which the above cyclic bridging moieties may optionally be fused to may be saturated or unsaturated and are selected from those having 4 to 10, more particularly 5, 6, or 7 ring members (selected from C, N, O and S in a particular embodiment), such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

It is also contemplated that, the metallocene catalysts may include their structural or optical or enantiomeric isomers (meso and racemic isomers) and mixtures thereof. In some embodiments, the metallocene compounds may be chiral and/or a bridged metallocene catalyst compound. Further, as used herein, a single, bridged, asymmetrically substituted metallocene catalyst component having a racemic and/or meso isomer does not, itself, constitute at least two different bridged, metallocene catalyst components.

Conventional Catalysts

Conventional catalysts are traditional Ziegler-Natta catalysts and Phillips-type chromium catalysts known in the art. Traditional Ziegler-Natta catalysts are those conventional-type transition metal catalysts that are well known in the art. Examples of conventional-type transition metal catalysts are disclosed in U.S. Pat. Nos. 4,115,639, 4,077,904 4,482,687, 4,564,605, 4,721,763, 4,879,359 and 4,960,741. Conventional-type transition metal catalyst compounds that may be used include, but are not limited to, transition metal compounds from Groups III to VIII of the Periodic Table of the Elements. Reference in this section to the Periodic Table of the Elements refers to the Periodic Table of the Elements, published and copyrighted by the International Union of Pure and Applied Chemistry, Inc., 2004. Also, any reference to a Group or Groups shall be to the Group or Groups as reflected in this Periodic Table of the Elements using the IUPAC system for numbering groups.

These conventional-type transition metal catalysts may be represented by the formula: $MR_x$, where M is a metal from Groups IIIB to VIII, preferably Group IVB, more preferably titanium; R is a halogen or a hydrocarbyloxy group; and x is the valence of the metal M. Non-limiting examples of R may include alkoxy, phenoxy, bromide, chloride and fluoride. Conventional-type transition metal catalysts where M is titanium may include, but are not limited to, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$. Other suitable catalysts are described in, U.S. Pat. Nos. 4,302,565 and 4,302,566 and in British Patent Application 2,105,355.

Conventional-type chromium catalyst compounds, often referred to as Phillips-type catalysts, suitable for use may include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,242,099 and 3,231,550.

Still other conventional-type transition metal catalyst compounds and catalyst systems suitable for use include those disclosed in U.S. Pat. Nos. 4,124,532, 4,302,565, 4,302,566 and 5,763,723 and EP Publications EP-A2 0 416 815 and EP-A10 420 436.

Conventional-type cocatalyst compounds for the above described conventional-type transition metal catalyst compounds may be represented by the formula $M^3M^4{}_vX^2{}_cR^3{}_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3{}_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Group 15 Atom and Metal Containing Catalysts

In some embodiments, "Group 15 atom and metal-containing catalysts," or the short-hand "Group 15-containing" catalyst, may be used either alone or with a metallocene or other olefin polymerization catalyst. Generally, Group 15-containing catalyst components may include complexes of Group 3 to 12 metal atoms, wherein the metal atom is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460, EP A1 0 893 454, and U.S. Pat. Nos. 5,318,935, 5,889,128, 6,333,389 B2, and 6,271,325 B1.

In some embodiments, the Group 15-containing catalyst components may include Group 4 imino-phenol complexes, Group 4 bis(amide) complexes, and Group 4 pyridyl-amide complexes that are active towards olefin polymerization to any extent. In one possible embodiment, the Group 15-containing catalyst component may include a bisamide compound such as $[(2,3,4,5,6\ Me_5C_6)NCH_2CH_2]_2NHZrBz_2$.

Mixed Catalysts

In some embodiments, a mixed catalyst may be used. A mixed catalyst includes a combination of two or more of catalyst components. In an embodiment, one or more metallocene catalysts or catalyst systems may be combined with one or more conventional-type catalysts or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010. It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090.

Activators

The polymerization process may use an activator. As used herein, the term "activator" refers to any compound or component, or combination of compounds and components, capable of enhancing the ability of a catalyst to oligomerize or polymerize unsaturated monomers, such as olefins. The catalyst compositions may be activated for oligomerization and/or polymerization catalysis in any manner sufficient to allow coordination or cationic oligomerization and or polymerization.

Generally, embodiments of the catalysts may contain a formal anionic ligand, such as hydride or hydrocarbyl, with an adjacent coordination site accessible to an unsaturated monomer. Coordination of an unsaturated monomer to the adjacent coordination site allows a migratory insertion reaction to form a metal alkyl. Repetition of this process causes the chain growth associated with oligomerization and/or polymerization. An activator thus may be any compound or component, or combination of compounds and components, that facilitates formation of a transition metal compound containing an adjacent coordinated olefin and hydride or hydrocarbyl.

When the transition metal compound contains, for example, at least one hydride or hydrocarbyl ligand, activation may be achieved by removal of formal anionic or neutral ligand(s), of higher binding affinity than the unsaturated monomer. This removal, also called abstraction, process may have a kinetic rate that is first-order or non-first order with respect to the activator. Activators that remove anionic ligands are termed ionizing activators. Alternatively, activators that remove neutral ligands are termed non-ionizing activators. Examples of activators may include strong Lewisacids which may play either the role of an ionizing or non-ionizing activator.

When the transition metal compound does not contain, for example, at least one hydride or hydrocarbyl ligands, then activation may be a one step or multi step process. One step in this process may include coordinating a hydride or hydrocarbyl group to the metal compound. A separate activation step may include removal of anionic or neutral ligands of higher binding affinity than the unsaturated monomer. These activation steps may occur, for example, in the presence of an olefin and occur either in series or in parallel. More than one sequence of activation steps is possible to achieve activation. The activator may also act to coordinate a hydride or hydrocarbyl group to the transition metal compound. When the transition metal compound does not contain at least one hydride or hydrocarbyl ligands, but does contain at least one functional group ligand, activation may be effected by substitution of the functional group with a hydride, hydrocarbyl or substituted hydrocarbyl group. This substitution may be effected with appropriate hydride or alkyl reagents of group 1, 2, 12, 13 elements as are known in the art. To achieve activation, it may be necessary to also remove anionic or neutral ligands of higher binding affinity than the unsaturated monomer.

In some embodiments, the activator may also act to coordinate a hydride or hydrocarbyl group to the transition metal compound. If the transition metal compound does not contain anionic ligands, then a hydride, hydrocarbyl or substituted hydrocarbyl may be coordinated to a metal using electrophilic proton or alkyl transfer reagents represented by H+(LB)nA−, (R)+(LB)nA−. R may be a hydrocarbyl or a substituted hydrocarbyl; LB is a Lewis-base, and wherein n=0, 1 or 2. Non-limiting examples of Lewis-bases are diethyl ether, dimethyl ether, ethanol, methanol, water, acetonitrile, N,N-dimethylaniline. A- is an anion, in one embodiment, a substituted hydrocarbon, a functional group, or a non-coordinating anion. Non-limiting examples of A- may include halides, carboxylates, phosphates, sulfates, sulfonates, borates, aluminates, alkoxides, thioalkoxides, anionic substituted hydrocarbons, anionic metal complexes, and the like.

Additional examples of suitable activators include those described in WO 98/07515, such as tris(2,2',2"-nonafluoro-biphenyl) fluoroaluminate. Combinations of activators are also contemplated, for example, alumoxanes and ionizing activators in combination as described in the following references may be used, EP-B1 0 573 120, WO 94/07928, WO 95/14044 and U.S. Pat. Nos. 5,153,157 and 5,453,410. WO 98/09996 describes activating metallocene catalyst compounds with perchlorates, periodates and iodates including their hydrates. WO 98/30602 and WO 98/30603 describe the use of lithium (2,2'-bisphenyl-ditrimethylsilicate).4THF as an activator for a metallocene catalyst compound. WO 99/18135 describes the use of organo-boron-aluminum activators. EP-B1-0 781 299 describes using a silylium salt in combination with a non-coordinating compatible anion. WO 2007/024773 suggests the use of activator-supports which may comprise a chemically-treated solid oxide, clay mineral, silicate mineral, or any combination thereof. Also, methods of activation such as using radiation (see e.g., EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in, for example, U.S. Pat. Nos. 5,849,852, 5,859,653 and 5,869,723 and PCT WO 98/32775.

Alumoxanes activators may be utilized as an activator in the catalyst composition of the invention. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. Alumoxanes are further described in, for example, U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1, and WO 94/10180.

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio, for example.

Alumoxanes may be produced by the hydrolysis of the respective trialkylaluminum compound. By way of example, MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in, for example, U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, WO 94/10180 and WO 99/15534. In some embodiments, a visually clear methylalumoxane may be used. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the name Modified Methylalumoxane Type 3A, disclosed in U.S. Pat. No. 5,041,584).

An ionizing or stoichiometric activator, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (see, for example, WO 98/43983), boric acid (see, for example, U.S. Pat. No. 5,942,459) or a combination thereof, may also be used. It is also within the scope of this disclosure to use neutral or ionic activators alone or in combination with alumoxane or modified alumoxane activators.

Examples of neutral stoichiometric activators may include tri-substituted boron, tellurium, aluminum, gallium and indium or mixtures thereof. The three substituent groups may be each independently selected from the group of alkyls, alkenyls, halogen, substituted alkyls, aryls, arylhalides, alkoxy and halides. In embodiments, the three substituent groups may be independently selected from the group of halogen, moNo. or multicyclic (including halosubstituted) aryls, alkyls, and alkenyl compounds and mixtures thereof; in a class of embodiments are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternatively, the three groups are alkyls having 1 to 4 carbon groups, phenyl, napthyl or mixtures thereof. In other embodiments, the three groups are halogenated, in an embodiment fluorinated, aryl groups. In yet other illustrative embodiments, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in, for example, European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994.

Supported Catalysts

In some embodiments, the catalyst component may be supported. For example, each component of the catalyst system may be supported on a support. Spray-drying may be used for combining the catalyst or catalyst system with the one or more supports. Spray-drying of the catalyst or catalyst system may result in catalyst systems having increased catalyst productivity as compared to other techniques for catalyst preparation.

As used herein, the term "supported" refers to one or more compounds that are deposited on, contacted with, vaporized with, adsorbed or absorbed in, or on, a support or carrier. The terms "support" and "carrier," for the purposes of this specification, are used interchangeably and are any support material, such as a porous support material, including inorganic or organic support materials.

Non-limiting examples of suitable supports include compounds comprising Group 2, 3, 4, 5, 13 and 14 oxides and chlorides. Suitable supports may include, for example, silica, magnesia, titania, zirconia, montmorillonite, phyllosilicate, alumina, silica-alumina, silica-chromium, silica-titania, magnesium chloride, graphite, magnesia, titania, zirconia, montmorillonite, phyllosilicate, and the like. Combinations of supports may also be suitable, including, for example, silica-chromium, silica-alumina, silica-titania, and the like. In one embodiment, fumed silica is a suitable support.

The support may possess an average particle size in the range of from about 0.1 to about 90 m, or from about 0.1 μm to 50 μm, or from about 1 to about 40 μm, or from about 5 to about 40 μm.

The support, such as an inorganic oxide, may have a surface area in the range of from about 10 to about 700 $m^2/g$, a pore volume in the range of from about 0.1 to about 4.0 cc/g, and an average particle size in the range of from about 1 to about 500 μm. In some embodiments, the support may have a surface area in the range of from about 50 to about 500 $m^2/g$, a pore volume of from about 0.5 to about 3.5 cc/g, and an average particle size of from about 10 to about 200 μm. In some embodiments, the support may have a surface area in the range of from about 100 to about 400 $m^2/g$, a pore volume from about 0.8 to about 3.0 cc/g, and an average particle size is from about 5 to about 100 μm. In some embodiments, the average pore size of the support may be from about 1 to about 50 μm. In some embodiments, the average pore size of the support may be in the range of from about 10 to about 1000 Å, of from about 50 to about 500 Å, or from about 75 to about 350 Å.

The catalyst components may be supported on the same or separate supports together with an activator, or the activator may be used in an unsupported form, or may be deposited on a support different from the supported catalyst components, or any combination thereof.

As previously described, spray-drying may be used for combining the catalyst components with the one or more supports. Spray-drying of a catalyst or catalyst system may result in catalyst or catalyst systems having increased catalyst productivity as compared to other techniques for catalyst preparation. Example techniques for spray-drying a catalyst or catalyst system are described, for example, in U.S. Pat. Nos. 5,648,310, 5,674,795, and 5,672,669, and EP0668295 B1.

The catalyst components and/or activators(s) may be combined with a particulate support material and then spray-dried, for example, to form a free flowing powder. By way of example, the catalyst components and optionally the activator(s) may be placed in solution, allowing them to react, then adding a filler material, such as silica or Cabosil™, the latter available from AeroMarine™ Products, and then forcing the solution at high pressure through a nozzle. The solution may be sprayed onto a surface or sprayed such that the droplets dry in midair. In some embodiments, the filler material (such as silica) may be dispersed in toluene, then stir in the activator solution, and then stir in the catalyst components. Typical slurry concentrations are about 5-8 wt %, for example. This formulation may sit as a slurry for as long as 30 minutes with mild stirring or manual shaking to keep it as a suspension before spray-drying. In some embodiments, the makeup of the dried material may be about 40-50 wt % activator (e.g., alumoxane), about 50-60 wt % filler material (e.g., $SiO_2$), and about 2 wt % catalyst components.

In some embodiments, the catalyst components can be added together in the desired ratio in the last step. In some embodiments, more complex procedures are possible, such as addition of a first catalyst component to the activator/filler material for a specified reaction time, followed by addition of a second catalyst component, mixed for another specified reaction time, after which the mixture is co-sprayed. For example, an additive, such as 1-hexene (e.g., about 10 vol %), may be present in the activator/filler mixture prior to addition of the first catalyst component.

In some embodiments, a metallocene catalyst component may be combined with a spray dried catalyst system and then introduced into a reactor.

In some embodiments, binders may be added to the mix. For example, the binders can be added as a means of improving the particle morphology, i.e. narrowing the particle size distribution, lower porosity of the particles and allowing for a reduced quantity of alumoxane, which is acting as the binder.

Polymerization Processes

Embodiments for producing polyolefins disclosed herein may employ any suitable process for the polymerization of olefins, including any suspension, solution, slurry, or gas phase process, using known equipment and reaction conditions, and are not limited to any specific type of polymerization system.

In general, the polymerization process may be a continuous gas phase process, such as a fluid bed process. In an embodiment, a fluid bed reactor may have a reaction zone and a velocity reduction zone (i.e., disengagement zone). The reaction zone includes a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

Useful gas phase polymerization processes include those that utilize a fluidized bed reactor. This type reactor, and means for operating the reactor, are well known and are described in, for example, U.S. Pat. Nos. 3,709,853, 4,003,712, 4,011,382, 4,302,566, 4,543,399, 4,882,400, 5,352,749, 5,541,270, and EP-A-0 802 202. These patents disclose gas phase polymerization processes wherein the polymerization medium is either mechanically agitated or fluidized by the continuous flow of the gaseous monomer and diluent.

The process described herein is suitable for the production of homopolymers of olefins, including ethylene, and/or copolymers, terpolymers, and the like, of olefins, including polymers comprising ethylene and at least one or more other olefins. The olefins may be alpha-olefins. The olefins, for example, may contain from 2 to 16 carbon atoms in one embodiment. In other embodiments, ethylene and a comonomer comprising from 3 to 12 carbon atoms, or from 4 to 10 carbon atoms, or from 4 to 8 carbon atoms, may be used. In an embodiment, the olefin is a monomer selected from the group consisting of ethylene, propylene, and any combination thereof.

In embodiments, polyethylene may be prepared by the process disclosed herein. Such polyethylene may include homopolymers of ethylene and interpolymers of ethylene and at least one alpha-olefin wherein the ethylene content is at least about 50% by weight of the total monomers involved. Olefins that may be used herein include ethylene, propylene, 1-butene, 1-pentene, 1-hexene, 1-heptene, 1-octene, 4-methylpent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

The content of the alpha-olefin incorporated into the copolymer may be no greater than 30 mol % in total, or may be from 3 to 20 mol %. The term "polyethylene" when used herein is used generically to refer to any or all of the polymers comprising ethylene described above.

In other embodiments, propylene-based polymers may be prepared by processes disclosed herein. Such propylene-based polymers may include homopolymers of propylene and interpolymers of propylene and at least one alpha-olefin wherein the propylene content is at least about 50% by weight of the total monomers involved. Comonomers that may be used may include ethylene, 1-butene, 1-pentene, 1-hexene, 1-heptene, 1-octene, 4-methylpentene-1,1-decene, 1-dodecene, 1-hexadecene and the like. Also usable are polyenes such as 1,3-hexadiene, 1,4-hexadiene, cyclopentadiene, dicyclopentadiene, 4-vinylcyclohexene-1,1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur. In one embodiment, the content of the alpha-olefin comonomer incorporated into a propylene-based polymer may be no greater than 49 mol % in total, from 3 to 35 mol % in other embodiments.

Hydrogen gas is often used in olefin polymerization to control the final properties of the polyolefin. Increasing the concentration (partial pressure) of hydrogen may increase the melt flow index (MFI) and/or melt index (MI) of the polyolefin generated. The MFI or MI can thus be influenced by the hydrogen concentration. The amount of hydrogen in the polymerization may be expressed as a mole ratio relative to the total polymerizable monomer, for example, ethylene, or a blend of ethylene and hexene or propylene. In an embodiment, the amount of hydrogen used in the polymerization processes is an amount sufficient to achieve the desired MFI or MI of the final polyolefin resin. Melt flow rate for polypropylene may be measured according to ASTM D 1238 (230° C. with 2.16 kg weight); melt index ($I_2$) for polyethylene may be measured according to ASTM D 1238 (190° C. with 2.16 kg weight).

Other gas phase processes contemplated include series or multistage polymerization processes. For example, a staged reactor employing two or more reactors in series may be used, wherein one reactor may produce, for example, a high molecular weight component and another reactor may produce a low molecular weight component. In some embodiments, the polyolefin is produced using a staged gas phase reactor. Such polymerization systems are described in, for example, U.S. Pat. Nos. 5,627,242, 5,665,818, and 5,677,375; and European publications EP-A-0 794 200, EP-B1-0 649 992, EP-A-0 802 202 and EP-B-634 421.

The one or more reactors in a gas phase or fluidized bed polymerization process may have a pressure ranging from about 0.7 to about 70 bar (about 10 to about 1,000 psia), or from about 14 to about 42 bar (about 200 to about 600 psia). The one or more reactors may have a temperature ranging from about 10° C. to about 150° C., or from about 40° C. to about 125° C. In some embodiments, the reactor temperature may be operated at the highest feasible temperature taking into account the sintering temperature of the polymer within the reactor. The superficial gas velocity in the one or more reactors may range from about 0.2 to about 1.1 meters/second (about 0.7 to about 3.5 feet/second), or from about 0.3 to about 0.8 meters/second (about 1.0 to about 2.7 feet/second).

Some embodiments may be used with gas phase polymerization systems at superatmospheric pressures in the range from 0.07 to 68.9 bar (1 to 1,000 psig), or from 3.45 to 27.6 bar (50 to 400 psig), or from 6.89 to 24.1 bar (100 to 350 psig), and temperatures in the range from 30 to 130° C., or from 65 to 110° C., or from 75 to 120° C., or from 80 to 120° C. In some embodiments, operating temperatures may be less than 112° C. In embodiments, stirred or fluidized bed gas phase polymerization systems may be used.

The polymerization process may be a continuous gas phase process that includes the steps of: (a) introducing a recycle stream (including ethylene and alpha olefin monomers) into the reactor; (b) introducing the supported catalyst system; (c) withdrawing the recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

One or more olefins, $C_2$ to $C_{30}$ olefins or alpha-olefins, including ethylene or propylene or combinations thereof, may be prepolymerized in the presence of a metallocene catalyst system prior to the main polymerization. The prepolymerization may be carried out batch-wise or continuously in gas, solution or slurry phase, including at elevated pressures. The prepolymerization may take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278, and 5,705,578 and European publication EP-B-0279 863 and WO 97/44371.

Processes disclosed herein may optionally use inert particulate materials as fluidization aids. These inert particulate materials can include carbon black, silica, talc, and clays, as well as inert polymeric materials. Carbon black, for example, has a primary particle size of about 10 to about 100 nanometers, an average size of aggregate of about 0.1 to about 30 microns, and a specific surface area from about 30 to about 1500 $m^2/g$. Silica has a primary particle size of about 5 to about 50 nanometers, an average size of aggregate of about 0.1 to about 30 microns, and a specific surface area from about 50 to about 500 $m^2/g$. Clay, talc, and polymeric materials have an average particle size of about 0.01 to about 10 microns and a specific surface area of about 3 to 30 $m^2/g$.

These inert particulate materials may be used in amounts ranging from about 0.3 to about 80%, or from about 5 to about 50%, based on the weight of the final product. They are especially useful for the polymerization of sticky polymers as disclosed in U.S. Pat. Nos. 4,994,534 and 5,304,588.

Chain transfer agents, promoters, scavenging agents and other additives may be used in the polymerization processes disclosed herein. Chain transfer agents are often used to control polymer molecular weight. Examples of these compounds are hydrogen and metal alkyls of the general formula $M^xR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$—$CCl_3$, $CF_2Cl$—$CCl_3$, and ethyltrichloroacetate. Such promoters are described in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of one of ordinary skill in the art. These additives may be added to the circulation loops, riser, and/or downer separately or independently from the catalyst, or as part of the catalyst In embodiments, the reactors disclosed herein are capable of producing greater than 500 lbs of polymer per hour (227 kg/hr) to about 300,000 lbs/hr (136,000 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 kg/hr) and most preferably greater than 65,000 lbs/hr (29,000 kg/hr) to greater than 150,000 lbs/hr (68,100 kg/hr).

The polymers produced can be used in a wide variety of products and end-use applications. The polymers produced may include, but are not limited to, linear low density polyethylene, low density polyethylenes, and high density polyethylenes. The polymers, including ethylene and propylene based polymers, have a density, for example, in the range of from about 0.86 g/cm³ to about 0.97 g/cm³, or from about 0.88 g/cm³ to about 0.965 g/cm³, or in the range of from about 0.900 g/cm³ to about 0.96 g/cm³.

The polymers may have a molecular weight distribution, a weight average molecular weight to number average molecular weight (Mw/Mn), for example, of greater than 1.5 to about 15. In other embodiments, the polymers may have an Mw/Mn of greater than 2 to about 10 or greater than about 2.2 to less than about 8.

Polymers made by the methods described herein may have a melt index (MI) or ($I_2$) as measured by ASTM-D-1238-E (190° C./2.16 kg), for example, in the range from 0.01 dg/min to 1000 dg/min. For example, the polymers may have a melt index of from about 0.01 dg/min to about 100 dg/min or from about 0.1 dg/min to about 100 dg/min.

The polymers may have a melt index ratio ($I_{21}/I_2$) ($I_{21}$ is measured by ASTM-D-1238-F, [190° C./21.6 kg]), in the range of from 5 to 300. For example, the polymers may have a melt index ratio of from about 10 to less than about 250, from about 15 to about 200, or from about 20 to about 180.

The polymers may be blended and/or coextruded with any other polymer. Non-limiting examples of other polymers include linear low density polyethylenes produced via conventional and/or single-site catalysis, elastomers, plastomers, high pressure low density polyethylene, high density polyethylenes, polypropylenes and the like.

Polymers produced by the process described here and blends thereof may be useful in such forming operations as film, pipe, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers may include, are not limited to, melt spinning, solution spinning and melt blown fiber operations for use in woven or non-woven form to make filters, diaper fabrics, medical garments, geotextiles, etc. Extruded articles may include medical tubing, wire and cable coatings, geomembranes, and pond liners. Molded articles include single and multi-layered constructions in the form of bottles, tanks, large hollow articles, rigid food containers and toys, etc.

EXAMPLES

The following examples are put forth so as to provide those skilled in the art with a complete disclosure and description of how to make and use the methods and systems of the invention, and are not intended to limit the scope of that which the inventors regard as their invention.

Preparation of PE Mineral Oil Gel 130 kg of mineral oil (HYDROBRITE® 380 PO White Mineral Oil, available from Sonneborn Refined Products) was charged to a 473-liter agitated vessel, which was then pressure-purged three times between 340 kPag and 14 kPag to remove the bulk of the oxygen from the vessel. After the pressure purging, the mineral oil was heated to 110° C. with agitation, and then 3.41 kg of a 1300 melt index (2.16 kg load) high-density polyethylene (HDPE) powder were changed to the stirring mineral oil. Vacuum was applied to the headspace of the vessel to help remove moisture and oxygen, and once at 700 mm Hg of vacuum, a slow sweep of nitrogen gas was applied to the bottom of the vessel to further assist removing moisture and oxygen. While stirring, the PE-mineral-oil mixture was further heated to between 125° C. and 130° C. to allow the HDPE powder to dissolve in the hot mineral oil. Inspection through a sight glass indicated the contents were a clear solution with no suspended particulates. After an hour of nitrogen sparging at greater than 120° C., approximately 100 kPag of nitrogen pressure was applied to the vessel headspace to maintain an inert environment.

The hot PE-mineral-oil solution was then pumped through a shell-and-tube heat exchanger with 23 small (about 0.073-inch inner diameter) tubes for good heat transfer. A co-current flow arrangement was employed, with a 5° C. ethylene glycol solution in the shell and the PE-mineral-oil solution in the tubes. The flow rate of the PE-mineral-oil solution was about 40 lb/hr, and the flow of the coolant was adjusted with a manual valve to achieve an exit temperature in a range of from 30-35° C. on the PE-mineral-oil gel.

The PE-mineral-oil gel exiting the heat exchanger was then passed up-flow through a 600-ml vessel equipped with a pitched-blade turbine running at 1000-1100 rpm to help homogenize the gel and further to reduce its viscosity. From the agitated vessel, the gel was fed into a cylinder inerted with nitrogen gas for future use in preparing reactor additive mixtures.

Preparation of PEI Dispersion in PE-Mineral-Oil Gel

A PE-mineral-oil gel prepared in the manner outlined above was used to make a stable dispersion of polyethyleneimine (LUPASOL® FG polyethylenimine) as follows. 27 kg of PE-mineral-oil gel was added to a 38-liter vessel agitated with a pitched blade turbine at approximately 1100 rpm. 1.42 kg of the polyethylenimine was slowly poured into the stirring gel over a period of about 5 minutes, and then the mixture was stirred for another 1 hour at the same speed. After an hour, the mixture was discharged into a cylinder for use as a reactor additive. Microscopic inspection of samples taken immediately after preparation and a month later show the presence of small droplets (in the range of 10-50 um) of polyethylenimine suspended in the matrix of the PE-mineral-oil gel.

Preparation of Polyetheramine in PE-Mineral-Oil Gel

A PE-mineral-oil gel prepared in the manner outline above was used to make a stable dispersion of polyetheramine (JEFFAMINE® ED-2003 polyetheramine) as follows. The polyetheramine was melted in an oven at about 70° C. and then added to a cylinder for inerting. This cylinder was placed in an oven at about 70° C., and the liquid polyetheramine was sparged with nitrogen gas while pulling vacuum on the headspace approximately 16 hours. The vacuum line was closed and the cylinder was pressurized with nitrogen gas to preserve inertness.

27 kg of the PE-mineral-oil gel was added to a 38-liter vessel agitated with a pitched blade turbine at approximately 1100 rpm. The gel was heated to 75° C. The cylinder of molten polyetheramine was connected to this vessel, and 3 kg of the polyetheramine was added to the stirring vessel over a period of about 10 minutes. This mixture was stirred at 75° C. for one hour. The temperature control on the vessel was set to full cooling, and the mixture was cooled as rapidly as possible to 15° C. In this particular equipment, it took about 15 minutes for the mixture to cool from 75° C. to about 50° where the polyetheramine starts to solidify, and about 1 hour to cool to 15° C. Once at 15° C. the mixture was discharged to a cylinder for use as a reactor additive. Microscopic inspection of samples taken both immediately after the preparation and a month later show the presence of small crystals of the polyetheramine suspended in the matrix of the PE-mineral-oil gel.

Preparation of Aluminum Distearate/Polyetheramine Blend in PE-Mineral-Oil Gel

A PE-mineral-oil gel prepared in the manner outline above was used to make a stable dispersion of aluminum distearate and polyetheramine (JEFFAMINE® ED-2003 polyetheramine) as follows. The polyetheramine was melted in an oven at about 70° C. and then added to a cylinder for inerting. This cylinder was placed in an oven at about 70° C., and the liquid polyetheramine was sparged with nitrogen gas while pulling vacuum on the headspace for approximately 16 hours. The vacuum line was closed, and the cylinder was pressurized with nitrogen gas to preserve inertness.

27 kg of the PE-mineral-oil gel was added to a 38-liter vessel agitated with a pitched blade turbine at approximately 1100 rpm. 1.69 kg of dry aluminum distearate powder was added to the stirring vessel. This mixture was heated to 75° C. The cylinder of molten polyetheramine was connected to this vessel, and 5.06 kg of polyetheramine was added to the stirring vessel over a period of about 10 minutes. This mixture was stirred at 75° C. for one hour. The temperature control on the vessel was set to full cooling, and the mixture was cooled as rapidly as possible to 15° C. In this particular equipment, it took about 15 minutes for the mixture to cool from 75° C. to about 50° C. where the polyetheramine starts to solidify, and about 1 hour to cool to 15° C. Once at 15° C., the mixture was discharged to a cylinder for use as a reactor additive. Microscopic inspection of samples take both immediately after the preparation and a month later show the presence of small crystals of polyetheramine and particles of aluminum stearate suspended in the matrix of the PE-mineral-oil.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used. In the preceding description and the appended claims, the singular forms "a," "an" and "the" include plural referents unless otherwise specified.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited; in the same way, ranges from any upper limit may be combined with any other upper limit to recite a range not explicitly recited.

All documents and references cited herein, including testing procedures, publications, patents, journal articles, etc. are herein fully incorporated by reference for all jurisdictions in which such incorporation is permitted and to the extent such disclosure is consistent with the description of the present invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Although individual embodiments are discussed, the invention covers all combinations of all those embodiments.

What is claimed is:

1. A polymerization process, comprising:
   providing a reactor component suspended in a hydrocarbon gel;
   introducing the reactor component to an olefin polymerization reactor; and
   polymerizing an olefin in the olefin polymerization reactor to form an olefin-based polymer.

2. The polymerization process of claim 1, wherein the hydrocarbon gel is prepared by a process comprising:

heating a hydrocarbon liquid to a temperature greater than or equal to about 70° C.;

dissolving a gelling agent in the hydrocarbon liquid; and cooling the hydrocarbon liquid to a temperature less than or equal to about 50° C.

3. The polymerization process of claim 2, wherein the process for preparing the hydrocarbon gel further comprises agitating the hydrocarbon gel after the step of cooling the hydrocarbon liquid.

4. The polymerization process of claim 1, wherein the hydrocarbon gel comprises a mineral oil.

5. The polymerization process of claim 1, wherein the hydrocarbon gel comprises isopentane.

6. The polymerization process of claim 1, wherein the hydrocarbon gel comprises a polymeric gelling agent comprising polyethylene.

7. The polymerization process of claim 1, wherein the hydrocarbon gel comprises a gelling agent comprising the reactor component.

8. The polymerization process of claim 7, wherein the reactor component comprises at least one additive selected from the group consisting of aluminum distearate, an ethoxylated amine, and any combination thereof.

9. The polymerization process of claim 1, wherein the reactor component comprises a continuity additive.

10. The polymerization process of claim 1, wherein the reactor component comprises a catalyst.

11. The polymerization process of claim 10, wherein the catalyst comprises a metallocene catalyst.

12. The polymerization process of claim 10, wherein the catalyst comprises a mixed catalyst.

13. The polymerization process of claim 1, wherein the polymerizing comprises feeding a metallocene catalyst, a Ziegler-Natta catalyst, a chromium-based catalyst, a Group IS-containing catalyst, or a mixed catalyst to the polymerization reactor.

14. The polymerization process of claim 1, wherein the polymerization reactor comprises a gas-phase reactor, and wherein the olefin comprises at least one olefin selected from the group consisting of ethylene, propylene, and combinations thereof.

15. A polymerization process, comprising:
providing a hydrocarbon gel comprising a reactor component suspended therein;

combining the hydrocarbon gel with an additional reactor feed;

introducing the combined mixture of the hydrocarbon gel and the additional reactor feed to an olefin polymerization reactor; and polymerizing an olefin in the olefin polymerization reactor to form an olefin-based polymer.

16. The polymerization process of claim 15, wherein the reactor component comprises a metallocene catalyst.

17. The polymerization process of claim 15, wherein the additional reactor feed comprises a catalyst, an activator, and a filler material.

18. The polymerization process of claim 17, wherein a catalyst is adsorbed onto a support material.

19. A hydrocarbon gel comprising:
a hydrocarbon liquid comprising mineral oil;

a gelling agent comprising polyethylene; and a reactor component comprising a continuity additive, wherein the continuity additive comprises aluminum stearate, aluminum distearate, or combinations thereof.

20. The hydrocarbon gel of claim 19, wherein the hydrocarbon gel is prepared by a process comprising:
heating the hydrocarbon liquid comprising mineral oil to a temperature greater than or equal to about 70° C.;

dissolving the gelling agent comprising polyethylene in the hydrocarbon liquid; and cooling the hydrocarbon liquid to a temperature less than or equal to about 50° C.

* * * * *